United States Patent [19]
Rea et al.

[11] Patent Number: 6,052,972
[45] Date of Patent: Apr. 25, 2000

[54] PORTABLE CONTAINMENT SLEEVER APPARATUS

[75] Inventors: Michael J. Rea; Roger A. Brown, both of North Augusta, S.C.

[73] Assignee: Westinghouse Savannah River Company LLC, Aiken, S.C.

[21] Appl. No.: 08/994,148

[22] Filed: Dec. 19, 1997

[51] Int. Cl.$^7$ ...................................... B65B 31/00
[52] U.S. Cl. ................. 53/512; 53/576; 53/581; 53/390
[58] Field of Search ............... 53/390, 409, 576, 53/581, 512, 399; 206/292, 298, 802; 190/110

[56] References Cited

U.S. PATENT DOCUMENTS

| | | |
|---|---|---|
| 2,954,797 | 10/1960 | Dryer . |
| 3,565,116 | 2/1971 | Gabin . |
| 3,650,298 | 3/1972 | Delmar . |
| 3,688,343 | 9/1972 | Ziolko . |
| 3,726,060 | 4/1973 | McMillan . |
| 3,831,635 | 8/1974 | Burton . |
| 3,892,059 | 7/1975 | Widigs . |
| 3,907,336 | 9/1975 | Siegmund . |
| 3,940,906 | 3/1976 | Leckband . |
| 3,972,761 | 8/1976 | Landgraf . |
| 3,975,795 | 8/1976 | Kupcikevicius . |
| 4,041,198 | 8/1977 | McPherson . |
| 4,355,826 | 10/1982 | Von Braun . |
| 4,386,796 | 6/1983 | Lyall et al. . |
| 4,422,675 | 12/1983 | Norris et al. . |
| 4,473,990 | 10/1984 | Thimon . |
| 4,495,751 | 1/1985 | Galbiati . |
| 4,516,756 | 5/1985 | Beatty . |
| 4,550,472 | 11/1985 | Temple . |
| 4,550,553 | 11/1985 | Gaither . |
| 4,574,023 | 3/1986 | Edwards . |
| 4,592,469 | 6/1986 | Gaither . |
| 4,607,866 | 8/1986 | Erlichman . |
| 4,636,162 | 1/1987 | Pavy . |
| 4,647,072 | 3/1987 | Westman . |
| 4,660,254 | 4/1987 | Kollross . |
| 4,888,937 | 12/1989 | Glenn . |
| 4,993,210 | 2/1991 | Kollross . |
| 5,016,424 | 5/1991 | Stirling . |
| 5,099,889 | 3/1992 | Ratzlaff . |
| 5,203,142 | 4/1993 | Kolross . |
| 5,490,742 | 2/1996 | Cronk . |
| 5,494,374 | 2/1996 | Youngs . |
| 5,590,981 | 1/1997 | Osborne . |

*Primary Examiner*—John Sipos
*Attorney, Agent, or Firm*—Dean W. Russell, Esq.; Geoff L. Sutcliffe, Esq.; Kilpatrick Stockton LLP

[57] ABSTRACT

A sleever apparatus includes an inner member with a central passage through which an item to be sleeved is passed. An outer member surrounds the inner member and defines a space between the members for holding a supply of containment material, which is preferably plastic sleeving. The apparatus has a handle which allows a user to hold the apparatus and walk the apparatus along the length of the item to be sleeved. As the user passes the item through the sleever apparatus, the containment material exits through a slit at one end of the apparatus in order to contain the item. The sleever apparatus may be formed of disposable materials, such as cardboard, and may be intended for a single use application. Alternatively, the sleever apparatus may be comprised of more permanent materials such as PVC or fiberglass. The sleever apparatus may include a serrated end for cutting the containment material and may include appropriate tubing and valves for either directing an inert gas into the containment material around the item or for withdrawing air from within the containment material in order to create a vacuum. In one embodiment, the sleever apparatus has a cartridge that can be replaced with another cartridge once the supply of the containment material has been depleted.

29 Claims, 3 Drawing Sheets

PORTABLE CONTAINMENT SLEEVER APPARATUS

The U.S. government has rights in this invention pursuant to contract number DEAC09-89-SR18035 between the U.S. Department of Energy and Westinghouse Savannah River Company.

FIELD OF THE INVENTION

This invention relates generally to apparatus for use in containing materials and, more particularly, relates to portable apparatus for containing pipes, hoses, or other items with a containment material.

BACKGROUND OF THE INVENTION

Proper safety measures often require that items be contained within a protective sleeving. Piping or hoses, for instance, may need to be sleeved to prevent any accidental spillage into their environment in the event that the piping or hoses spring a leak. The piping or hoses may contain cooling water inhibited with sodium chromate, hazardous chemicals, or may carry materials that, by themselves, are harmless but which pose a danger with chemicals or other substances found in their environment.

In addition to piping and hoses, proper safety measures require that other items be sleeved. For instance, items that have been exposed, or potentially exposed, to hazardous chemicals or radioactive materials within a hazardous area must be contained before they are removed from the hazardous area. Conductivity probes and other components are items that are frequently found within a radioactive environment and are contained prior to their removal from this environment.

Presently, the piping, hoses, and other items are contained or sleeved by manually sliding rolls of plastic sleeving over the item. This process is cumbersome and difficult and can be especially difficult with items that are long or heavy. The process is typically both time consuming and labor intensive since it may require more than one person to contain the item. A need therefore exists for an apparatus which renders the sleeving process quicker, easier, and less labor intensive.

Another problem with the current method of containing pipes, hoses, or other items is that the plastic sleeving often becomes damaged during the containment of the item. When the sleeving is being placed around the item, the plastic sleeving is moved over the item and can easily become torn by the item. Tears or rips in the sleeving are unacceptable from a safety perspective and, as a result, the item must be resleeved. The process of sleeving or containing the item is thus further delayed and made more laborious.

SUMMARY OF THE INVENTION

A sleever apparatus according to a preferred embodiment of the invention includes an inner member having a central passage and an outer member. The sleever apparatus includes a pair of end caps secured to either end of the inner and outer members. In addition to securing the inner member to the outer member, the end caps also separate the inner member from the outer member to define a space between the members for receiving a supply of containment material. Both of the end caps include a central aperture through which an item may pass and one of the end caps further includes a slit through which the containment material may pass. The sleever apparatus preferably includes a handle to allow the user to easily carry the sleever apparatus along the length of the item.

To sleeve or contain an item, one end of the containment material is passed through the slit and is secured to one end of the item or is otherwise placed in an essentially fixed location relative to the item. The inner and outer members of the sleever apparatus are then moved along the length of the item and the containment material is discharged through the slit in the one end cap. When the entire length of the item has been contained or when the desired length of the containment material has been reached, the user may then cut the containment material and secure it to the item, secure it to another item, or may seal the end of the containment material.

The inner and outer members of the sleever apparatus may have various shapes and sizes. For instance, in a first embodiment, the inner and outer members both have circular-cross-sections. In other embodiments, the inner and outer members may have rectangular cross-sections or triangular cross-sections. The inner and outer members may be formed to have a relatively large central passage to accommodate larger items or may have a relatively small central passage to accommodate smaller items.

According to another aspect of the invention, the inner member of the sleever apparatus forms a cartridge that is releasably attached to the outer member. When the supply of the containment materials has been depleted, the cartridge may be removed from the sleever apparatus and a new cartridge with a fresh supply of containment material may be inserted and attached to the outer member. The cartridge within the sleever apparatus may be replaced so that the apparatus has an inner member of a different size or shape or so that a different containment material may be used. The containment material may be secured to the inner member or, alternatively, may be secured to the outer member of the apparatus.

According to yet a further aspect of the invention, the sleever apparatus includes a connector, valve, and tubing for either directing a gas or liquid into the containment material around the item or for withdrawing a liquid or gas from within the containment material. The connector, valve, and tubing, for instance, may be connected to a source of gas or air and this gas or air is pumped into the containment material in order to check the containment material for leaks. In addition to checking for leaks, the material pumped into the containment material may be used to preserve or protect the item being contained. The connector, valve, and tubing, on the other hand, may be connected to a vacuum source for withdrawing the gas or liquid from the containment material.

One end of the sleever apparatus preferably includes a mechanism for cutting the containment material. When the item has been contained or when a desired length of the containment material has been dispensed from the apparatus, the user can easily cut the containment material from the apparatus with the cutting mechanism. This cutting mechanism may comprise a serrated edge located at one end of the sleever apparatus or may comprise other types of cutting devices.

Accordingly, it is an object of the present invention to provide an apparatus for containing items.

It is another object of the present invention to provide an apparatus for containing materials which is easy to use.

It is a further object of the invention to provide a portable sleever apparatus which is easily transported.

It is yet another object of the present invention to provide a sleever apparatus that is sized or shaped to correspond with the size or shape of the item to be contained.

It is still a further object of the present invention to provide a sleever apparatus that can be easily provided with a new supply of containment material.

It is another object of the present invention to provide a sleever apparatus that reduces tears in the containment material and which also can be used to detect leaks in the containment material.

BRIEF DESCRIPTION OF THE DRAWINGS

The accompanying drawings, which are incorporated in and form a part of the specification, illustrate preferred embodiments of the present invention and, together with the description, serve to explain the principles of the invention. In the drawings.

DETAILED DESCRIPTION OF THE INVENTION

Figure 1A:
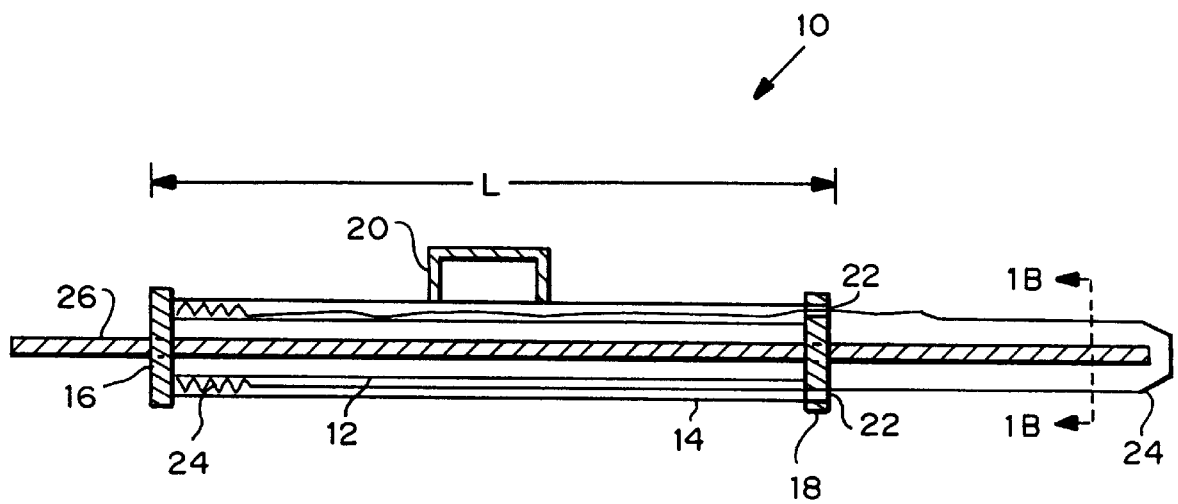
FIG. 1A is a plan side view of a sleever apparatus according to a first embodiment of the invention.
Figure 1B:
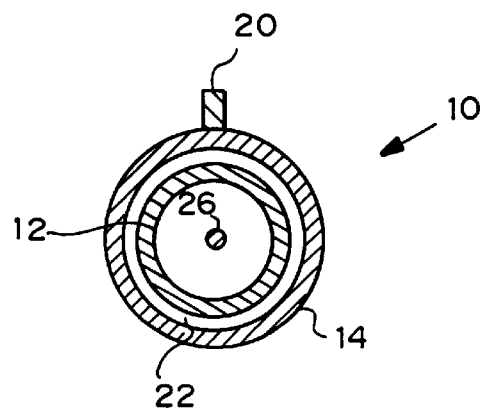
FIG. 1B is a cross-sectional view of the sleever of FIG. 1A.

With reference to FIGS. 1A and 1B, a sleever 10 according to a first embodiment of the invention includes an inner member 12 and an outer member 14. A pair of end caps 16 and 18 are mounted at either end of the members 12 and 14 and secure the members 12 and 14 in a spaced relationship relative to each other. Within the space between the members 12 and 14, the sleever apparatus 10 is able to store a length of containment material 24. The containment material 24 exits the sleever apparatus 10 through a slit 22 in end cap 18 of the apparatus 10. The sleever apparatus 10 preferably includes a handle 20 for allowing a user to easily carry the apparatus 10 along a length of the item to be contained.

In the example shown in FIGS. 1A and 1B, the sleever apparatus 10 has a length L equal to three feet, although the sleever apparatus 10 may have other lengths depending upon the intended use of the sleever apparatus 10, desired weight of the apparatus 10, or based on other factors. Both the inner member 12 and the outer member 14 have a circular cross-section and the end cap 18 has a circular slit 22 through which the containment material 24 may pass. The containment material 24 preferably comprises plastic sleeving which may be three mils thick for most applications but may be either thicker or thinner depending upon a particular use of the sleever apparatus 10.

In use, the plastic sleeving 24 is compressed within the space between the inner member 12 and the outer member 14 so that a large length of the plastic sleeving 24 may be retained within the portable sleever apparatus 10. The plastic sleeving 24, as shown in FIG. 1A, may be folded upon itself in an accordion-like fashion to increase the length of sleeving 24 that may be contained within the sleever apparatus 10. The item to be contained, such as the piping 26 shown in FIGS. 1A and 1B, is then passed through a center of the end cap 16 and through a central passage of the inner member 12. The plastic sleeving 24 is sealed or otherwise secured in place while the user moves the sleever apparatus 10 along the length of the piping 26. The user may easily grasp the sleever apparatus 10 by its handle 20 and slide the sleever apparatus 10 along the length of the piping 26. As the user moves the containment sleeve 10 along the length of the piping 26, the plastic sleeving 24 is drawn out through the slits 22 in the end cap 18. When the desired length of the piping 26 is reached, the user cuts the plastic sleeving 24 and proceeds to seal the plastic sleeving 24.

In contrast to the conventional method of containing materials, the process of containing an item with the portable containment sleever 10 is easy and may be quickly performed. As alluded to above, the user simply secures or seals one end of the plastic sleeving 24 and then proceeds to walk along the length of the item needing to be contained. As the user walks along the length of the item, the plastic sleeving 24 exits the sleever apparatus 10 through the slits 22. The sleever apparatus 10 allows a user to quickly contain an item with minimal effort.

This sleever apparatus 10 differs from the conventional process in that it reduces the likelihood of a tear in the plastic sleeving. With the conventional method, it was rather difficult and cumbersome to contain items and the plastic sleeving would often become snagged or torn. The sleever apparatus 10, on the other hand, helps to maintain the integrity of the plastic sleeving 24 and reduces the likelihood of any tears or snags. The item being contained, such as the piping 26, essentially does not move relative to the plastic sleeving 24 which has already been discharged from the sleever apparatus 10. The plastic sleeving 24 within the moving apparatus 10 is confined within the space between the inner member 12 and the outer member 14 and does not come in moving contact with the item. Most of the friction between the sleever apparatus 10 and the item therefore occurs between the end caps 16 and 18 and along an inner surface of the inner member 12. Since the plastic sleeving 24 is relatively isolated from this friction, the integrity of the plastic sleeving 24 is maintained.

Figure 2A:
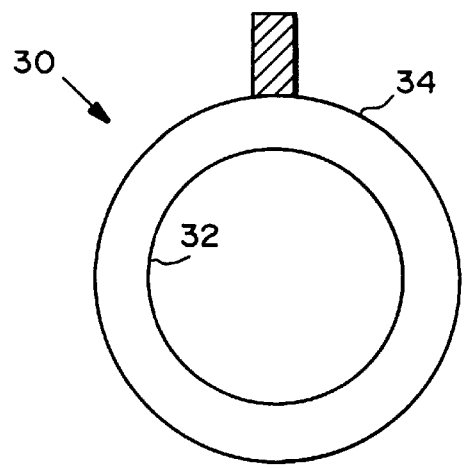
FIG. 2A is a cross-sectional view of a sleever apparatus according to a second embodiment of the invention.

The sleever apparatus 10 is not limited to any particular size or shape of the inner member 12 or outer member 14. The inner diameter of the inner member 12, for instance, may be greater or lesser and may vary according to the size of the item to be contained. The inner diameter of the outer member 14 may also vary due to the size of the inner member 12 and also due to the desired spacing from the inner member 12. The outer member 14, for example, may be spaced a greater length from the inner member 12 to receive a larger supply of the plastic sleeving 24. FIG. 2A depicts a sleever apparatus 30 according to a second embodiment of the invention in which an inner member 32 and an outer member 34 have dimensions greater than that of the inner member 12 and outer member 14 of sleever apparatus 10.

Figure 2B:
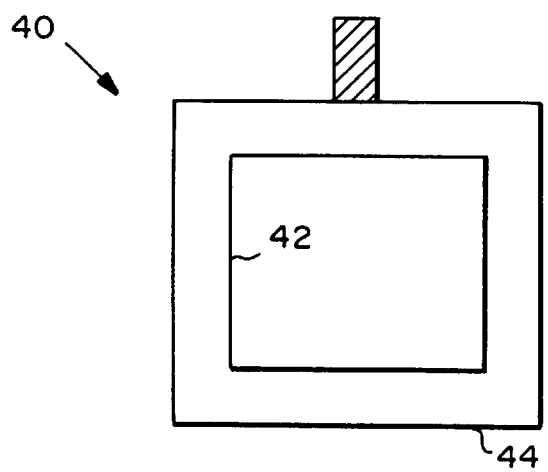
FIG. 2B is a cross-sectional view of a sleever apparatus according to a third embodiment of the invention.
Figure 2C:
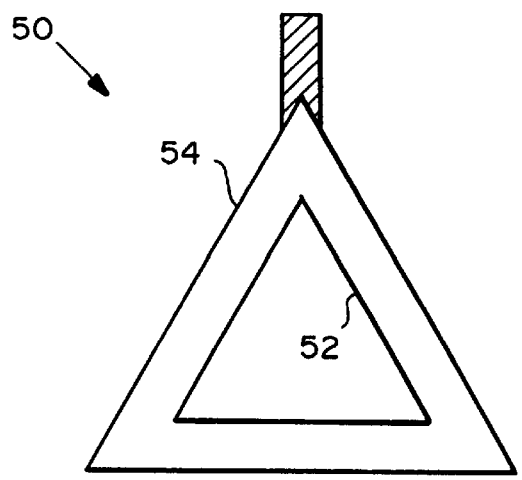
FIG. 2C is a cross-sectional view of a sleever apparatus according to a fourth embodiment of the invention.
Figure 3:
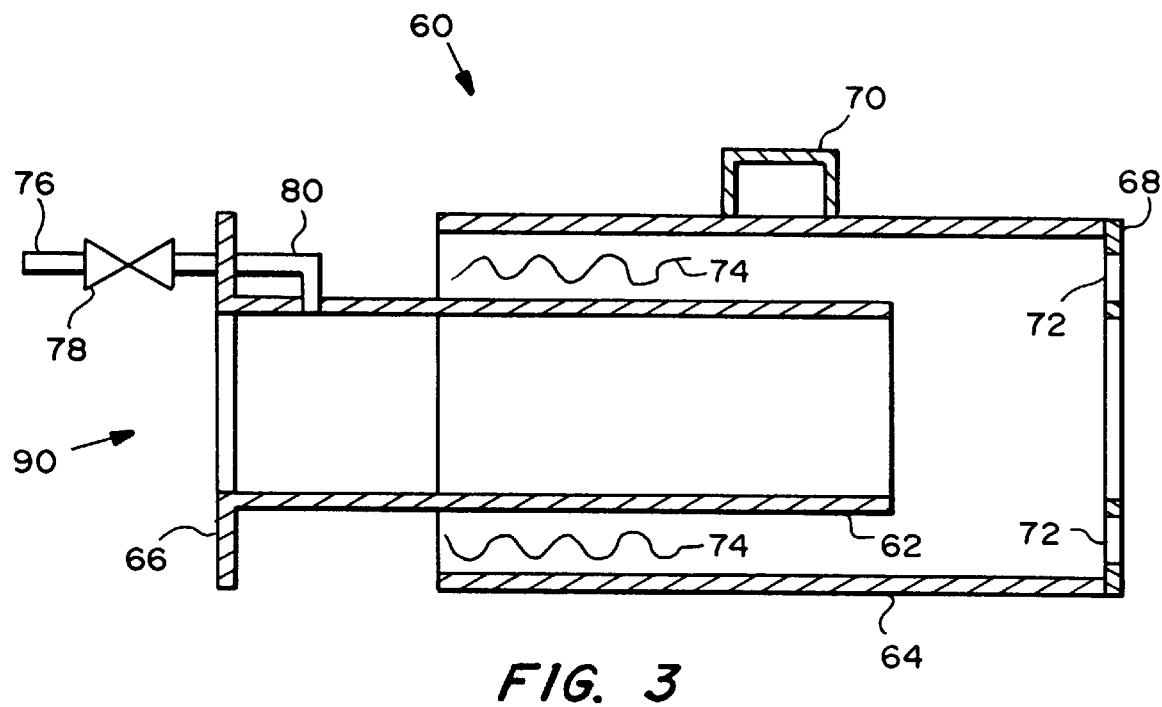
FIG. 3 is a plan side view of a sleever apparatus according to a fifth embodiment of the invention.

Furthermore, the sleever apparatus 10 is not limited to an inner member 12 and an outer member 14 which have circular cross-sections. As shown in FIG. 2B, an inner member 42 and an outer member 44 of a sleever 40 according to a third embodiment of the invention may have cross-sections in the shape of a square or rectangle. As another example, FIG. 2C illustrates an inner member 52 and an outer member 54 of a sleever 50 according to a fourth embodiment of the invention which have cross-sections in the shape of a triangle. As should be apparent, the inner member and outer member of a sleever apparatus according to the invention may have other shapes for their cross-sections than those provided in the abovelisted examples.

The sleever apparatus 60 according to a fifth embodiment of the invention includes an inner member 62 and an outer member 64. The inner member 62 is secured to a first end cap 66 and the outer member 64 is secured to a second end cap 68. A handle 70 is secured to the outer member 64 and a slit 72 is formed in the second end cap 68 through which a containment material 74 may pass.

The inner member 62 and the end cap 66 from a cartridge 90 that is releasably secured to the outer member 64. In the preferred embodiment, a supply of the containment material 74 is attached to the inner member 62, such as with a releasable adhesive or with an outer netting material. Thus, when the sleever apparatus 60 has dispensed all of its containment material 74 through the slit 72, the cartridge 90 may be removed from the outer member 64 and a new cartridge 90 with a fresh supply of containment material 74 may be inserted and attached to the outer member 64. The cartridge 90 may be releasably attached to the outer member 64 in any suitable manner. For instance, the end cap 66 may be secured to the outer member 64 with retaining clips, wing nuts, bolts, or other type of fastener. Alternatively, the first cap 66 may be threaded and may be screwed into corresponding threads in the outer member 64. Other ways to releasably secure the cartridge 90 to the outer member 64 will be apparent to those skilled in the art.

In addition to providing a new supply of containment materials 74, a new cartridge 90 may also have a different shape than the other cartridges 90 that may be inserted and attached to the outer member 64. As a result, a cartridge 90 may be attached to the outer member 64 which is more appropriate for the size of the item to be contained. For instance, smaller items may be contained with a sleever apparatus 60 having an inner member 62 of a relatively small diameter whereas larger items may be contained with the use of an inner member 62 having a relatively large diameter. The cartridge 90 may be replaced for reasons other than the size of the item or whether the supply of the containment material is depleted. As an example, the cartridges 90 may contain different containment materials 74 or may have containment materials 74 each having a different thickness. Other uses for the cartridges 90 will be apparent to those skilled in the art.

Although the containment material 74 has been described as being secured to the inner member 62, the containment material 74 may alternatively be secured to the outer member 64. A supply of the containment material 74 may extend along the length of the outer member 64 with one end of the containment material 74 extending slightly through the slit 72 and the end cap 68. A suitable cartridge 90 is then attached to the outer member 64. One advantage of attaching the supply of the containment material 74 to the outer member 64 rather than the inner member 62 is that the end of the containment material 74 may be easily passed through the slit 72 and may be releasably secured to the end cap 68. The user consequently need not bother with passing the containment material 74 through the slit 72, which may be necessary when the supply of the containment material 74 is secured to the inner member 62.

The portable sleever apparatus 60 may also include tubing 80, a valve 78, and a connector 76. One application of the connector 76, valve 78, and tubing 80 is to direct a gas into the containment material 74 around the item to be sleeved. This gas may comprise air and can be used to detect leaks in the containment material 74. The gas may alternatively comprise an inert gas to preserve the item by inhibiting oxidation, which is particularly useful in the storage of carbon steel pipes. The connector 76, valve 78, and tubing 80 may also be used to direct a liquid into the containment material 74 around the item. This liquid may be used for the purposes described above with reference to inserted gases. The connector 76, valve 78, and tubing 80 may insert other gases or liquids and may insert gases and liquids for purposes other than those described above.

Rather than directing a liquid or gas into the containment material 74 around the item, the connector 76, valve 78 and tubing 80 may be used to withdraw a liquid or gas from around the item. For instance, a vacuum pump may be connected to the connector 76 to allow vacuum sealing of the item. The storage of the item in a vacuum may be appropriate for a desired packaging of the item or for protecting the item.

Figure 4:
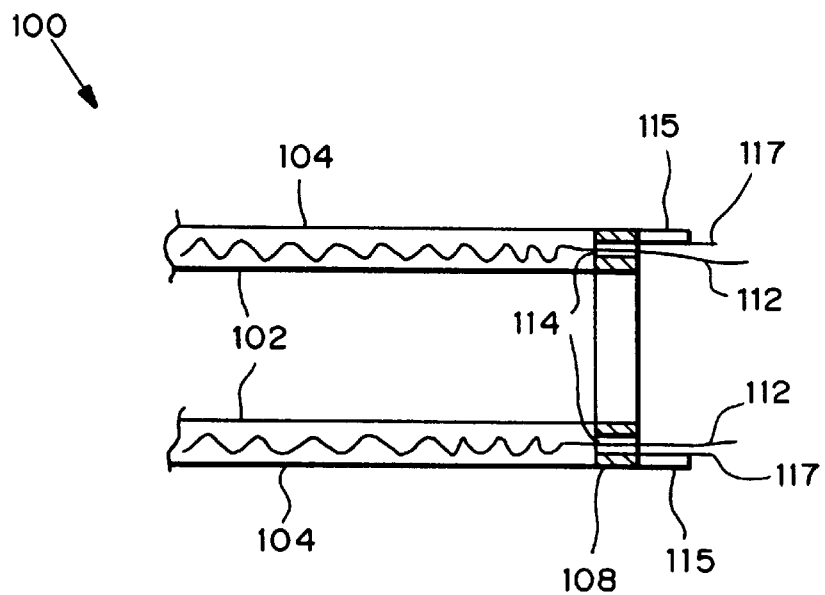
FIG. 4 is a cross-sectional view of a sleever apparatus according to a sixth embodiment of the invention.

A partial view of the sleever apparatus 100 according to a sixth embodiment of the invention is shown in FIG. 4. The sleever apparatus 100 includes an inner member 102 and an outer member 104 between which is stored a supply of containment material 112. A pair of end caps are secured at either end of the sleever apparatus 100 with end cap 108 having a slit 114 through which the containment material 112 may pass. The sleever apparatus 100 further includes a device 115 having a serrated end positioned transverse to the length of the sleever apparatus 100 for cutting the containment material 112. The device 115 may extend around the entire perimeter of the sleever apparatus 100 as shown or may extend only partially around its perimeter. The sleever apparatus 100 preferably includes a protective member 117 for preventing any contact between the containment material 112 and the cutting device 115 during the sleeving of an item. The protective member 117 can pivot so that after the desired length of containment material has been dispensed the user can pivot the protective member 117 away from the cutting device 115 thereby allowing the user to easily cut the containment material 112.

The cutting device 115 may comprise other types of cutting devices. For instance, the cutting device may not have a serrated end but may have a sharp edge for cutting the containment material 112. Also, the cutting device may be comprised of two cutting members which, when moved toward each other, slice the containment material 112 in a manner similar to a pair of scissors. Furthermore, the cutting device may pivot into a protective position relative to the containment material 112 and need not be associated with a protective member. Other ways in which the containment material 112 may be cut will be apparent to those skilled in the art.

The sleever apparatus according to the invention may be formed with any suitable materials. For instance, a disposable sleever may be comprised of inner and outer members formed of cardboard or other disposable material. Preferably, the materials forming the inner and outer members are recyclable in order to reduce waste. The sleever apparatus according to the invention, on the other hand, may be formed of more permanent materials. These materials include polyvinyl chloride (PVC), fiberglass, and reinforced cardboard. Also, depending upon the materials used for the inner and outer members and for the end caps, the end caps may be secured to the inner and outer members in any appropriate manner. For example, the end caps may be secured to the inner and outer members with an adhesive or, alternatively, with a fastener.

While the foregoing specification teaches the principles of the present invention, with examples provided for the purpose of illustration, it will be understood that the practice of the invention encompasses all of the usual variations, adaptations, or modifications, as come within the scope of the following claims and their equivalents.

We claim:

1. A sleever apparatus for use in containing an item, comprising:
   an inner member having a central passage;
   an outer member;
   a first end cap secured to one end of the inner and outer members and having a first aperture;
   a second end cap secured to an opposite end of the inner and outer members and having a second aperture and a slit;
   the first and second end caps for securing the inner and outer members to each other and for defining a space between the inner member and the outer member, the space between the inner member and the outer member being for storing a supply of containment material;
   the first and second apparatus align with the central passage and the slit aligns with the space;
   wherein the item may be sleeved by moving the inner and outer members along the item so that the item passes through the first aperture in the first end cap, through the central passage in the inner member, and through the second aperture in the second end cap and so that the containment material is discharged through the slit in the second end cap to sleeve the item.

2. The sleever apparatus as set forth in claim 1, further comprising a handle affixed to the outer member.

3. The sleever apparatus as set forth in claim 1, further comprising means, attached to one of the first end cap or the second end cap, for cutting the containment material.

4. The sleever apparatus as set forth in claim 1, further comprising a serrated edge on one of the first end cap or the second end cap for cutting the containment material.

5. The sleever apparatus as set forth in claim 1, wherein the inner and outer members have a circular cross-section.

6. The sleever apparatus as set forth in claim 1, wherein the inner and outer members have a rectangular cross-section.

7. The sleever apparatus as set forth in claim 1, wherein the inner and outer members have a triangular cross-section.

8. The sleever apparatus as set forth in claim 1, wherein the containment material comprises plastic sleeving.

9. The sleever apparatus as set forth in claim 1, wherein the inner and outer members comprise cardboard.

10. The sleever apparatus as set forth in claim 1, wherein the inner and outer members comprise polyvinyl chloride.

11. The sleever apparatus as set forth in claim 1, wherein the inner and outer members comprise fiberglass.

12. The sleever apparatus as set forth in claim 1, wherein the outer member includes a sight to allow a user to view a quantity of the containment material.

13. The sleever apparatus as set forth in claim 1, further comprising means for receiving a supply of gas and for directing the gas into the containment material around the item.

14. The sleever apparatus as set forth in claim 1, further comprising tubing for directing gas from a source to within the aperture of the inner member.

15. The sleever apparatus as set forth in claim 14, further comprising a valve for preventing the gas from traveling along the tubing from the aperture of the inner member toward the source.

16. The sleever apparatus as set forth in claim 1, further comprising tubing for use in withdrawing air from the aperture of the inner member.

17. The sleever apparatus as set forth in claim 16, further comprising a valve for preventing air from traveling into the aperture of the inner member.

18. The sleever apparatus as set forth in claim 1, wherein the apparatus further includes the containment material.

19. The sleever apparatus as set forth in claim 18, further comprising markings on the containment material at regular intervals along the length of the containment material.

20. The sleever apparatus as set forth in claim 18, further comprising warning markings on a terminal end of the containment material.

21. The sleever apparatus as set forth in claim 1, further comprising means for releasably securing the inner member to the outer member.

22. The sleever apparatus as set forth in claim 1, further comprising a second inner member wherein the inner member is releasably secured to the outer member and may be detached from the outer member so that second inner member may be secured to the outer member.

23. The sleever apparatus as set forth in claim 22, wherein the second inner member has a second central passage which differs in dimensions from the central passage of the inner member.

24. The sleever apparatus as set forth in claim 22, wherein the second inner member is preloaded with a supply of the containment material.

25. The sleever apparatus as set forth in claim 1, wherein the inner member and the first end cap are releasably secured to the outer member and second end cap and may be detached from the outer member and second end cap.

26. A hand-held, moveable apparatus for placing a sleeve about an elongated, stationary object, comprising:
   a. an inner member defining (i) a central passage adapted to surround at least a portion of the stationary object, (ii) an outer periphery and (iii) an end;
   b. an outer member defining (i) an inner periphery and (ii) an end;
   c. dischargeable containment material positioned between the inner periphery of the outer member and the outer periphery of the inner member; and
   d. a cap secured to the ends of the outer and inner members and defining (i) an aperture adapted to surround at least a portion of the stationary object and (ii) means, comprising a slit at least partially surrounding the aperture, for discharging the containment material as a sleeve about at least a portion of the stationary object as the apparatus moves.

27. An apparatus according to claim 26 further comprising means, attached to the cap, for cutting the containment material.

28. An apparatus according to claim 26 further comprising means for receiving a supply of gas and for determining the existence of any leaks in the containment material by directing the gas into the sleeve of containment material about the stationary object.

29. An apparatus according to claim 26 further comprising means for receiving a supply of inert gas and for inhibiting oxidation of the stationary object by directing the gas into the sleeve of containment material about the stationary object.

* * * * *

UNITED STATES PATENT AND TRADEMARK OFFICE
CERTIFICATE OF CORRECTION

PATENT NO. : 6,052,972  
DATED : April 25, 2000  
INVENTOR(S) : Michael J. Rea and Roger A. Brown Page 1 of 1

It is certified that error appears in the above-identified patent and that said Letters Patent is hereby corrected as shown below:

Column 4,  
Line 67, add a space between "above" and "listed"

Signed and Sealed this

Twenty-fifth Day of December, 2001

*Attest:*

*Attesting Officer*

JAMES E. ROGAN  
*Director of the United States Patent and Trademark Office*